US011829026B2

(12) United States Patent
Meng et al.

(10) Patent No.: US 11,829,026 B2
(45) Date of Patent: Nov. 28, 2023

(54) DISPLAY PANEL, DRIVING METHOD THEREOF AND DISPLAY DEVICE

(71) Applicant: BOE Technology Group Co., Ltd., Beijing (CN)

(72) Inventors: Xiandong Meng, Beijing (CN); Jifeng Tan, Beijing (CN); Wei Wang, Beijing (CN); Xianqin Meng, Beijing (CN); Jian Gao, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 133 days.

(21) Appl. No.: 16/963,332

(22) PCT Filed: Sep. 26, 2019

(86) PCT No.: PCT/CN2019/108107
§ 371 (c)(1),
(2) Date: Sep. 28, 2021

(87) PCT Pub. No.: WO2021/056323
PCT Pub. Date: Apr. 1, 2021

(65) Prior Publication Data
US 2023/0138214 A1    May 4, 2023

(51) Int. Cl.
*G02F 1/1335*    (2006.01)
*F21V 8/00*    (2006.01)
(Continued)

(52) U.S. Cl.
CPC ..... *G02F 1/133548* (2021.01); *G02B 6/0035* (2013.01); *G02F 1/13306* (2013.01);
(Continued)

(58) Field of Classification Search
CPC .......... G02F 1/133548; G02F 1/13306; G02F 1/133514; G02F 1/13439; G02F 1/133512;
(Continued)

(56) References Cited

U.S. PATENT DOCUMENTS

2007/0165307 A1    7/2007  Perkins
2013/0050602 A1    2/2013  Macpherson et al.
(Continued)

FOREIGN PATENT DOCUMENTS

CN    104503152 A        4/2015
CN    105700268 A  *    6/2016  ............. G02B 30/25
(Continued)

*Primary Examiner* — Edward J Glick
*Assistant Examiner* — William D Peterson
(74) *Attorney, Agent, or Firm* — ArentFox Schiff LLP; Michael Fainberg (57) ABSTRACT

Embodiments of the present disclosure provide a display panel, a driving method thereof and a display device. The display panel includes: a light guide plate, configured to propagate light incident at a set angle by total reflection; an opposite substrate, arranged opposite to the light guide plate; a liquid crystal layer, arranged between the light guide plate and the opposite substrate; and a plurality of light extraction structures. Each light extraction structure includes: a light taking grating arranged on a surface of the light guide plate, a first wire grid structure arranged between the light guide plate and the liquid crystal layer, a second wire grid structure arranged between the liquid crystal layer and the opposite substrate, and a first electrode structure and a second electrode structure arranged between the light guide plate and the opposite substrate. A direction of a light transmitting axis of the first wire grid structure is vertical to a direction of a light transmitting axis of the second wire grid structure. The first electrode structure is of a blocky structure. The second electrode structure includes a plurality of strip-shaped sub- (Continued)

electrodes which are parallel to each other; and an included angle between an extension direction of the sub-electrode and the direction of the light transmitting axis of the first wire grid structure ranges from 10° to 80°.

14 Claims, 7 Drawing Sheets

(51) Int. Cl.
*G02F 1/133* (2006.01)
*G02F 1/1343* (2006.01)

(52) U.S. Cl.
CPC .... *G02F 1/13439* (2013.01); *G02F 1/133514* (2013.01); *G02F 1/133512* (2013.01); *G02F 2201/307* (2013.01); *G02F 2203/30* (2013.01)

(58) Field of Classification Search
CPC .......... G02F 2201/307; G02F 2203/30; G02B 6/0035
USPC .......................................................... 349/33
See application file for complete search history.

(56) References Cited

U.S. PATENT DOCUMENTS

| 2016/0246113 A1 | | 8/2016 | Tang | |
| 2018/0188563 A1 | * | 7/2018 | Yao | ................... G02F 1/133514 |
| 2019/0033656 A1 | | 1/2019 | Tan et al. | |

FOREIGN PATENT DOCUMENTS

| CN | 106597748 A | | 4/2017 | |
| CN | 107121832 A | | 9/2017 | |
| CN | 107219685 A | | 9/2017 | |
| CN | 107238974 A | * | 10/2017 | ........... G02B 6/0016 |
| CN | 107238974 A | | 10/2017 | |

* cited by examiner

| controlling light, taken out by the light taking grating and passing through the first wire grid structure and the second wire grid structure in sequence, to be incapable of emitting out from the display panel, and the display panel to be in a dark state, by applying a first electrical signal to the first electrode structure and the second electrode structure, respectively | S301 |

| forming an electric field at both sides of the liquid crystal layer, by applying a second electrical signal and a third electrical signal to the first electrode structure and the second electrode structure, respectively; and controlling, by the electric field, the liquid crystal layer to be equivalent to a diffraction grating structure, an included angle between a grating vector of the diffraction grating structure and the direction of the light transmitting axis of the first wire grid structure to be an acute angle, and the display panel to display in different gray scales, by driving liquid crystal molecules in the liquid crystal layer to deflect | S302 |

Fig. 12

DISPLAY PANEL, DRIVING METHOD THEREOF AND DISPLAY DEVICE

FIELD

The present disclosure relates to the field of display technologies, in particular to a display panel, a driving method thereof and a display device.

BACKGROUND

With the continuous development of display technologies, a new display panel appears in liquid crystal display (LCD) technologies. The display panel takes out light in a light guide plate through a light taking opening, moreover, shading structures in one-to-one correspondence with the light taking openings are arranged on a side, facing away from the light guide plate, of a liquid crystal layer. An electric field is applied to control liquid crystal molecules in the liquid crystal layer to deflect, to realize a dark state and a bright state of the display panel.

However, no light is emitted from a positive viewing angle of the display panel, therefore, the displayed contents cannot be viewed from the positive viewing angle of the display panel.

SUMMARY

An embodiment of the present disclosure provides a display panel, including: a light guide plate, configured to propagate light incident at a set angle by total reflection; an opposite substrate, arranged opposite to the light guide plate; a liquid crystal layer, arranged between the light guide plate and the opposite substrate; a plurality of light extraction structures, where each light extraction structure includes: a light taking grating arranged on a surface of the light guide plate, a first wire grid structure arranged between the light guide plate and the liquid crystal layer, a second wire grid structure arranged between the liquid crystal layer and the opposite substrate, and a first electrode structure and a second electrode structure arranged between the light guide plate and the opposite substrate; a direction of a light transmitting axis of the first wire grid structure is vertical to a direction of a light transmitting axis of the second wire grid structure; the first electrode structure is of a blocky structure; and the second electrode structure includes a plurality of strip-shaped sub-electrodes which are parallel to each other; and an included angle between an extension direction of each sub-electrode and the direction of the light transmitting axis of the first wire grid structure ranges from 10° to 80°.

Optionally, in an embodiment of the present disclosure, in each light extraction structure, an orthographic projection of the light taking grating on the light guide plate is within an orthographic projection of the first wire grid structure on the light guide plate, the orthographic projection of the light taking grating on the light guide plate is within an orthographic projection of the second wire grid structure on the light guide plate; a projected area of the light taking grating on the light guide plate is smaller than a projected area of the first wire grid structure on the light guide plate, and the projected area of the light taking grating on the light guide plate is smaller than a projected area of the second wire grid structure on the light guide plate.

Optionally, in an embodiment of the present disclosure, in the each light extraction structure, the orthographic projection of the first wire grid structure on the light guide plate is within the orthographic projection of the second wire grid structure on the light guide plate, and the projected area of the first wire grid structure on the light guide plate is smaller than or equal to the projected area of the second wire grid structure on the light guide plate.

Optionally, in an embodiment of the present disclosure, the light taking grating is arranged on a side, facing away from the liquid crystal layer, of the light guide plate, and the light taking grating is a reflection grating.

Optionally, in an embodiment of the present disclosure, the light taking grating is arranged on a side, facing the liquid crystal layer, of the light guide plate, and the light taking grating is a transmission grating.

Optionally, in an embodiment of the present disclosure, first electrode structures in the plurality of light extraction structures are of an integrated structure.

Optionally, in an embodiment of the present disclosure, the first electrode structure is arranged between the liquid crystal layer and the first wire grid structure; and the second electrode structure is arranged between the first electrode structure and the liquid crystal layer.

Optionally, in an embodiment of the present disclosure, in a direction vertical to the extension direction of each sub-electrode, a sum of a width of the each sub-electrode and a width of a gap between two adjacent sub-electrodes ranges from 2 μm to 10 μm.

Optionally, in an embodiment of the present disclosure, the display panel further includes: a coupling element arranged between a light source and a side surface of the light guide plate; and the coupling element is configured to couple the light emitted by the light source to the light guide plate at the set angle.

Optionally, in an embodiment of the present disclosure, the display panel further includes: a color film layer arranged between the opposite substrate and the liquid crystal layer; the color film layer includes: a plurality of color film units in one-to-one correspondence with the plurality of light extraction structures.

Optionally, in an embodiment of the present disclosure, the color film layer is arranged between the opposite substrate and a film layer at which the second wire grid structure locates; and an orthographic projection of the second wire grid structure on the light guide plate is within a range of an orthographic projection of a corresponding color film unit on the light guide plate.

Optionally, in an embodiment of the present disclosure, the display panel is divided into a plurality of pixel units; the plurality of pixel units are in one-to-one correspondence with the plurality of light extraction structures; the each light extraction structure is arranged within a corresponding pixel unit; and each pixel unit includes a transparent region and a region of a corresponding light extraction structure.

Optionally, in an embodiment of the present disclosure, the display panel further includes: a shading layer arranged between the opposite substrate and a film layer at which the second wire grid structure locates; a pattern of the shading layer is arranged between adjacent pixel units; and a gap is formed between the pattern of the shading layer and each of the color film units.

Correspondingly, an embodiment of the present disclosure further provides a method for driving the above display panel, and the method includes: controlling light, taken out by the light taking grating and passing through the first wire grid structure and the second wire grid structure in sequence, to be incapable of emitting out from the display panel, and the display panel to be in a dark state, by applying a first electrical signal to the first electrode structure and the second electrode structure, respectively; and forming an electric field at both sides of the liquid crystal layer, by applying a second electrical signal and a third electrical signal to the first electrode structure and the second electrode structure, respectively; and controlling, by the electric field, the liquid crystal layer to be equivalent to a diffraction grating structure, an included angle between a grating vector of the diffraction grating structure and the direction of the light transmitting axis of the first wire grid structure to be an acute angle, and the display panel to display in different gray scales, by driving liquid crystal molecules in the liquid crystal layer to deflect.

Correspondingly, an embodiment of the present disclosure further provides a display device, wherein the display device includes the above display panel and a light source; the light source is arranged on a side face of the light guide plate, and is configured to provide the light guide plate with the light incident at the set angle.

DETAILED DESCRIPTION OF THE EMBODIMENTS

Figure 1:
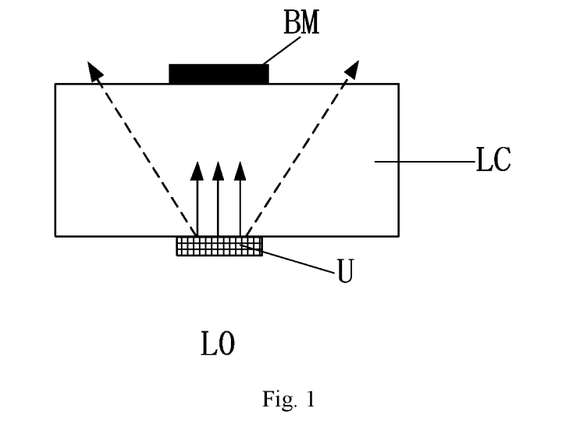
FIG. 1 is a schematic diagram of a display principle of a display panel in a dark state (L0).
Figure 2:
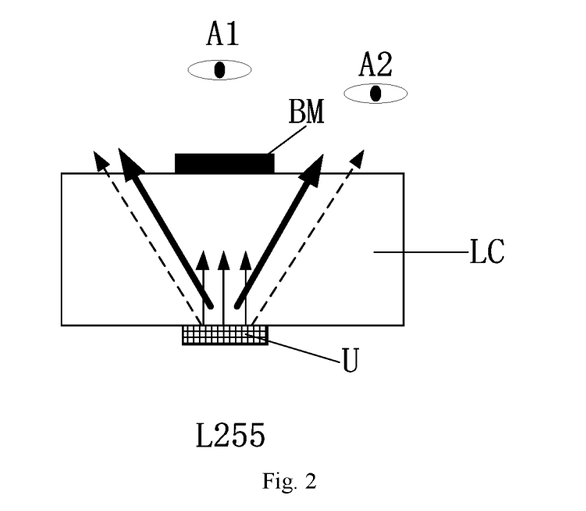
FIG. 2 is a schematic diagram of a display principle of a display panel in a bright state (L255).

FIG. 1 and FIG. 2 are schematic diagrams of display principles of a display panel. FIG. 1 is a schematic diagram of a display principle of a display panel in a dark state (L0). FIG. 2 is a schematic diagram of a display principle of a display panel in a bright state (L255).

As shown in FIG. 1, when no electric field is applied at two sides of a liquid crystal layer LC, liquid crystal molecules in the liquid crystal layer LC do no deflect the light, and light taken out by a light guide plate (not shown in the figure) at a light taking opening U shines upon a shading structure BM after passing through the liquid crystal layer LC, and is completely absorbed by the shading structure BM, therefore, at this time, the display panel is in the dark state (L0).

As shown in FIG. 2, through applying an electric field to the two sides of the liquid crystal layer LC, a refractive index of the liquid crystal layer LC can be driven to change periodically, so that the liquid crystal layer LC is equivalent to a diffraction grating structure, such that light emitted from the light outlet U is emitted towards a region outside the shading structure BM after passing through the diffraction grating structure formed by the liquid crystal layer LC, therefore, at this time, the display panel is in the bright state (L255), and through applying different electric fields to the liquid crystal layer LC, different diffraction efficiencies of the liquid crystal layer LC to the light can be realized, thereby realizing multi-grayscale display.

As shown in FIG. 2, since the display panel realizes the dark state through the shading structure BM which shades light, when the display panel displays in the bright state, the diffraction grating structure formed by the liquid crystal layer LC scatters the light, only large-angle light can deviate from the shading structure BM and is emitted. The angle of large-angle light is generally within a range of 40° to 90°, while small-angle light will be shaded by the shading structure BM and cannot be emitted. Therefore, while the display panel is displaying, human eyes can only view displayed pictures from a side of the display panel, and can not view the display pictures from a positive viewing angle of the display panel because no light is emitted from the positive viewing angle of the display panel. That is, human eyes cannot view the displayed pictures at a position of the positive viewing angle A1 in the figure and can only view the displayed pictures at a position of the side surface A2.

In addition, since the size of the light taking opening U is small, limited by an aperture of the light taking opening U, when the light taking opening U performs collimated light taking, the problem of repeated diffraction of a pinhole will exist, as shown by the dotted arrow in FIG. 1, pinhole diffraction light will exist at the edge of the collimated light, such that the shading structure BM cannot shade and absorb all the light, thereby leading to dark-state light leakage of the display panel, and leading to a low display contrast of the display panel.

Based on this, an embodiment of the present disclosure provides a display panel, a driving method thereof and a display device.

A brief description will be given below on specific embodiments of the display panel, the driving method thereof and the display device provided in an embodiment of the present disclosure in combination with accompanying drawings. The shape and size of each part in the accompanying drawings do not reflect true proportions, merely aiming at schematically illustrating the content of the present disclosure.

Figure 3:
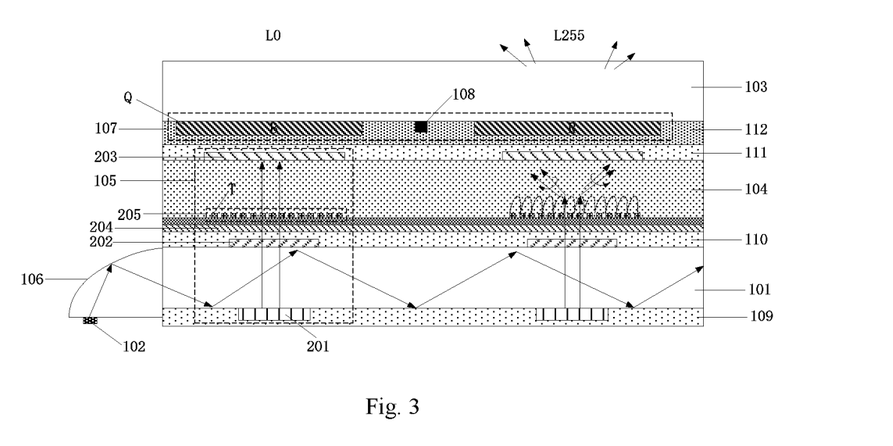
FIG. 3 is a structural schematic diagram of a display panel provided in an embodiment of the present disclosure.
Figure 4:
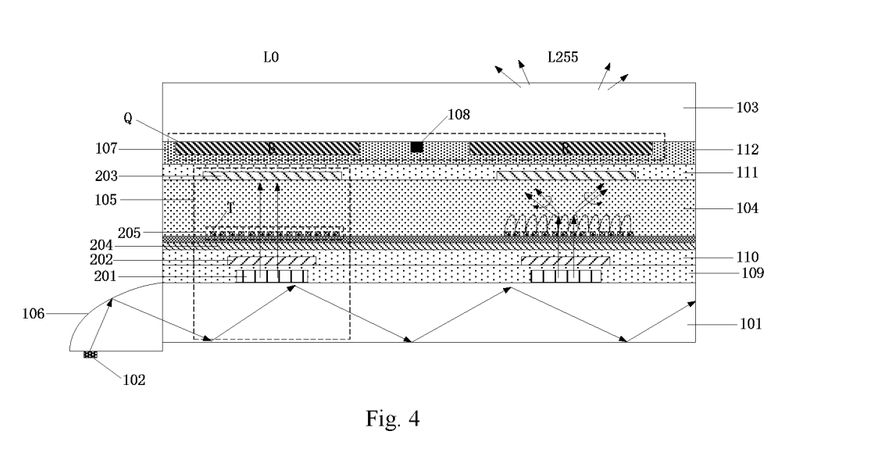
FIG. 4 is a structural schematic diagram of another display panel provided in an embodiment of the present disclosure.

An embodiment of the present disclosure provides a display panel, as shown in FIG. 3 and FIG. 4, the display panel includes: a light guide plate 101, configured to propagate light incident at a set angle by total reflection; an opposite substrate 103, arranged opposite to the light guide plate 101; a liquid crystal layer 104, arranged between the light guide plate 101 and the opposite substrate 103; a plurality of light extraction structures 105.

Each light extraction structure 105 includes: a light taking grating 201 arranged on a surface of one side of the light guide plate 101, a first wire grid structure 202 arranged between the light guide plate 101 and the liquid crystal layer 104, a second wire grid structure 203 arranged between the liquid crystal layer 104 and the opposite substrate 103, and a first electrode structure 204 and a second electrode structure 205 arranged between the light guide plate 101 and the opposite substrate 103.

A direction of a light transmitting axis of the first wire grid structure 202 is vertical to a direction of a light transmitting axis of the second wire grid structure 205; the first electrode structure 204 is of a blocky structure; and the second electrode structure 205 includes a plurality of strip-shaped sub-electrodes T which are parallel to each other; and an included angle between an extension direction of the sub-electrode T and the direction of the light transmitting axis P1 of the first wire grid structure 202 is between 10° and 80°.

As to the display panel provided in an embodiment of the present disclosure, through setting a first wire grid structure 202 and a second wire grid structure 203 with transmission axes being vertical to each other, when no electric field is applied to two sides of a liquid crystal layer 104, liquid crystal molecules in the liquid crystal layer 104 maintain an initial configuration state. For a display panel with a normally black mode, the initial configuration state of the liquid crystal molecules is as follows: a long axis direction of the liquid crystal molecules is parallel to the plane in which the light guide plate 101 is located, the liquid crystal layer 104 has no effect on the light, and the light taken out by the light taking grating 201 cannot be emitted after passing through the first wire grid structure 202 and the second wire grid structure 203, thereby realizing the dark state (L0) of the display panel, as shown by the left half in FIG. 3 and FIG. 4. After an electric field is applied to the two sides of a liquid crystal layer 104, liquid crystal molecules in the liquid crystal layer 104 are deflected, a certain included angle is formed between the long axis direction of the liquid crystal molecules and the plane in which the light guide plate 101 is located, to drive the refractive index of the liquid crystal layer 104 to change periodically, and enable the liquid crystal layer 104 to be equivalent to a diffraction grating structure. The diffraction grating structure can diffract and modulate light, to diffract and scatter the light in an inclined manner, in this way, through two-dimensional deflection of the transmission direction of light, the polarization direction of light is no longer vertical to the second wire grid structure 203, such that the light can pass through the second wire grid structure 203 and is emitted, thereby realizing bright-state (L255) display of the display panel, as shown by the right half in FIG. 3 and FIG. 4. Moreover, light is emitted after penetrating through the second wire grid structure, therefore, the displayed content can be seen in the positive viewing angle direction of the display panel. Due to the diffraction and modulation effects of the liquid crystal layer, the collimated light can be scattered into multidirectional divergent light, such that users can view the displayed pictures of the display panel from each direction, and the display panel has a wide viewing angle.

It should be noted that, as shown in FIG. 3 and FIG. 4, to more clearly indicate the display principle of the above display panel, the dark state (L0) and the bright state (L255) of the display panel are combined into one figure to indicate, and this does not mean that the two conditions will appear simultaneously. During specific implementation, the display state of the display panel can be set according to actual requirements, which will not be defined herein.

Specifically, the above light guide plate 101 is a total reflection conduction structure, and can enable the light with a set angle to propagate with total reflection inside the light guide plate 101. The light with a set angle can be understood as the light satisfying the conditions of total reflection. During specific implementation, the incident angle of light can be provided to the light guide plate 101 through a light source 102, such that most of the light shining upon the light guide plate 101 can satisfy the condition of total reflection.

In addition, to ensure that light can be propagated with total reflection in the light guide plate, and to ensure the light emitting effect of the display panel, the upper and lower surfaces of the light guide plate 101 and the opposite substrate 103 should be ensured to have a favorable flatness and finish, moreover, the side surfaces of the light guide plate 101 and the opposite substrate 103 can be polished, to ensure flatness and finish of the side surfaces.

Optionally, the above light source 102 can be a light emitting diode (LED), for example, a micro-LED, or an organic light-emitting diode (OLED), and the specific parts of the light source 102 are not defined herein. The above light source 102 can be a monochromatic source, can also be a mixed light source, and can adopt a light source with a narrow spectrum.

Generally, a display panel includes a plurality of pixel units, and a plurality of light extraction structures 105 in the display panel can be in one-to-one correspondence with the plurality of pixel units. The light taking grating 201 in the above light extraction structure 105 can be of a micro-nano grating structure. The light taking grating 201 is arranged on the surface of the light guide plate 101, and can take out the light transmitted within the light guide plate 101 in a collimating manner and shine upon the first wire grid structure 202. To ensure that the light taking grating 201 has a favorable light taking luminous effect, the above light taking grating 201 can adopt the materials with a high refractive index, for example, the light taking grating 201 can adopt SiNx and other materials, and can also adopt other materials, which is not defined herein.

The above first wire grid structure 202 and the second wire grid structure 203 are respectively arranged at two sides of a liquid crystal layer 104, and the direction of a light transmitting axis of the first wire grid structure 202 is vertical to the direction of a light transmitting axis of the second wire grid structure 203, such that through a manner of applying an electrical signal to the liquid crystal layer 104, whether the light penetrates through the second wire grid structure 203 can be controlled, and the total amount of light penetrating through the second wire grid structure 203 can be controlled, to realize dark-state display and bright-state display in different gray scales of the display panel.

Specifically, the above first grid wire structure 202 and the second grid wire structure 203 can be metal wire grid structures. Compared with traditional polarizers, the metal wire grid structure has the advantages of small thickness and small size, can only be arranged in a display region, and the region setting with no metal wire grid can serve as a transparent region, such that the transparent region can have a higher transparency. The above first wire grid structure 202 and the second wire grid structure 203 can also be film layers with a polarizing performance, or, can also be other structures with a polarization selectivity, and the specific implementation manners of the first wire grid structure 202 and the second wire grid structure 203 are not defined herein.

Figure 5:
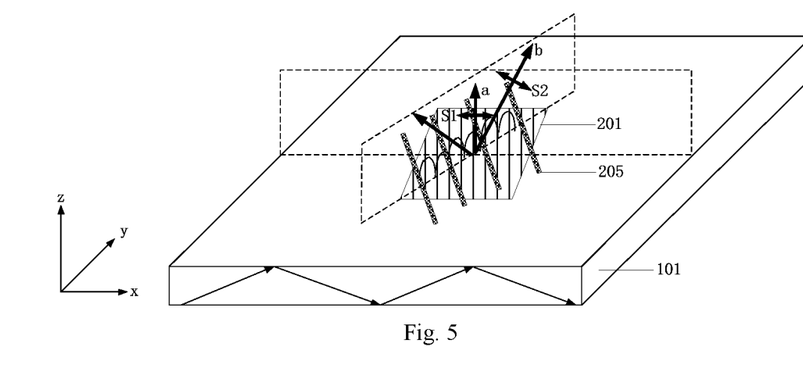
FIG. 5 is a schematic diagram of a display principle of a display panel in an embodiment of the present disclosure in a bright state.

FIG. 5 is a schematic diagram of a display principle of a display panel in a bright state.

As shown in FIG. 5, light a refers to the light penetrating through the first wire grid structure after being taken out by the light taking grating 201, and the polarization direction of light a is the direction S1 in the figure.

It can be seen obviously from the figure that, the plane in which the light a is transmitted in the waveguide is a zx plane, that is, the transmission angle of light a is (θ≠0, φ=0), where θ represents an included angle between the light and the x direction, and φ represents a rotation angle of the light along the z direction.

After light a passes through a liquid crystal layer, under the adjustment of the diffraction grating structure formed by the liquid crystal layer, the collimated light a is two-dimensionally diffracted to multi-angle light, such as light b in FIG. 5. The polarization direction of light b is direction S2 in the figure.

It can be seen obviously from the figure that, after diffraction of a liquid crystal layer, light b is in a three-dimensional space of x-y-z, that is, light b has two-dimensional stereoscopic angular component, that is, the transmission angle of light b is (θ≠0, φ≠0).

It can be seen from the comparison between light a and light b that, after the diffraction effect of the liquid crystal layer, the light direction can be subjected to two-dimensional modulation, that is, the light vector direction is changed two-dimensionally, to form the bright state of the display panel.

Optionally, to ensure the liquid crystal luminous effect, liquid crystals with a large refractive index difference can be selected to form the above liquid crystal layer, specifically, the liquid crystals generally have a birefringent effect, and a large refractive index difference means that the difference between the ordinary refraction index and the extraordinary refraction index of birefringence is large.

Figure 6:
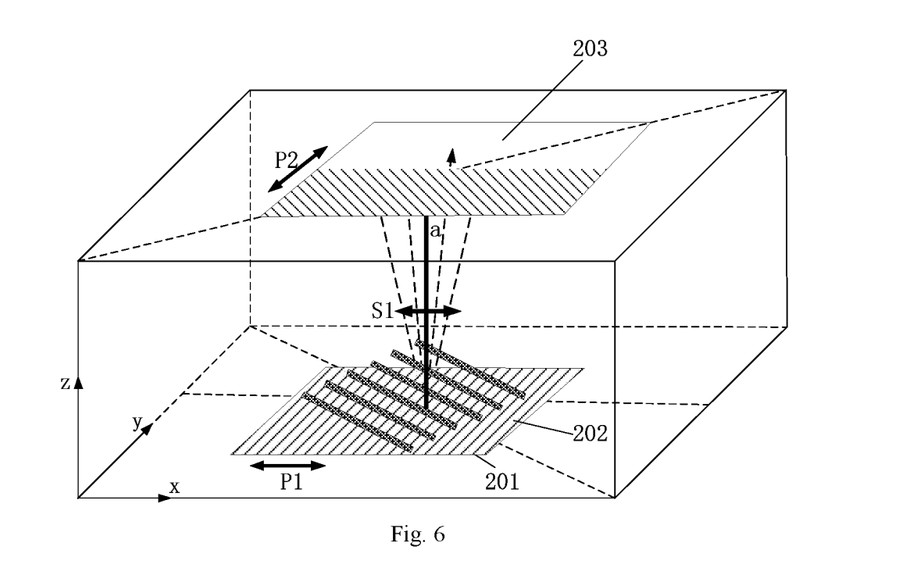
FIG. 6 is a schematic diagram of a display principle of a display panel in an embodiment of the present disclosure in a dark state.

FIG. 6 is a schematic diagram of a display principle of a display panel in a dark state.

As shown in FIG. 6, the light taken out by a light taking grating 201 is a collimated beam, although limited by the size of the light taking grating 201, the collimated beam taken out by the light taking grating 201 will have a pinhole diffraction light to a certain degree, however, the path at which the collimated beam propagates major energy is still mainly at a single angle.

Light a is obtained after the light taken out by the light taking grating 201 passes through the first wire grid structure 202. The dotted line in the figure represents the pinhole diffraction light of light a. The direction of the light transmitting axis of the first wire grid structure 202 is direction P1. The polarization direction S1 of light a is the same as the direction of the light transmitting axis P1 of the first wire grid structure 202.

When the display panel is in a dark state, the liquid crystal layer has no effect on the light, light a shines upon the second wire grid structure 203 in a collimating manner. Since the polarization direction S1 of light a is vertical to the direction of the light transmitting axis P2 of the second wire grid structure 203, light a cannot penetrate through the second wire grid structure 203, meanwhile, the pinhole diffraction light of the light a is also shaded by the second wire grid structure 203, such that the display panel is in a dark state.

Figure 7:
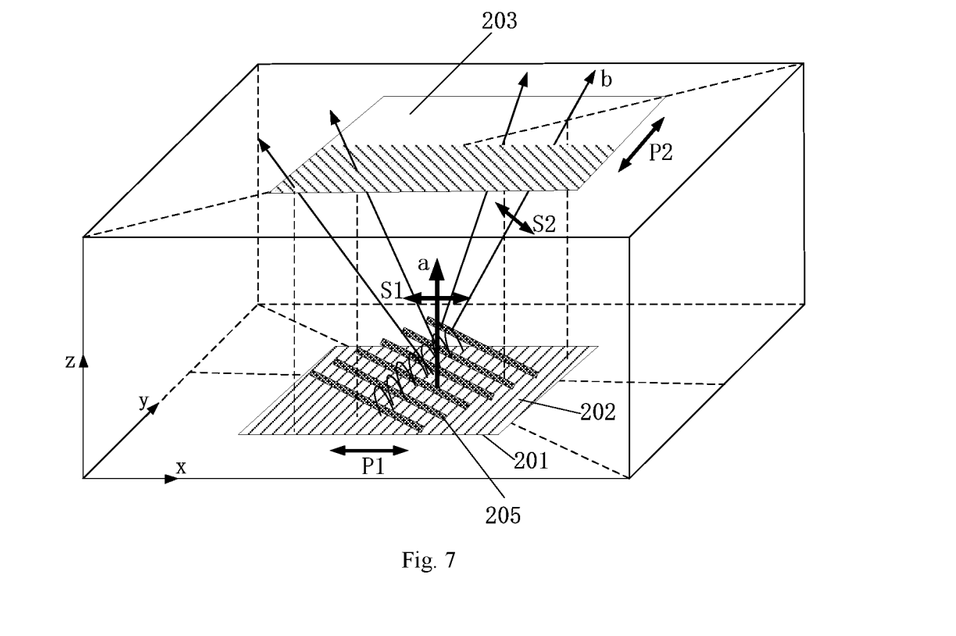
FIG. 7 is another schematic diagram of a display principle of a display panel in an embodiment of the present disclosure in a bright state.
Figure 8:
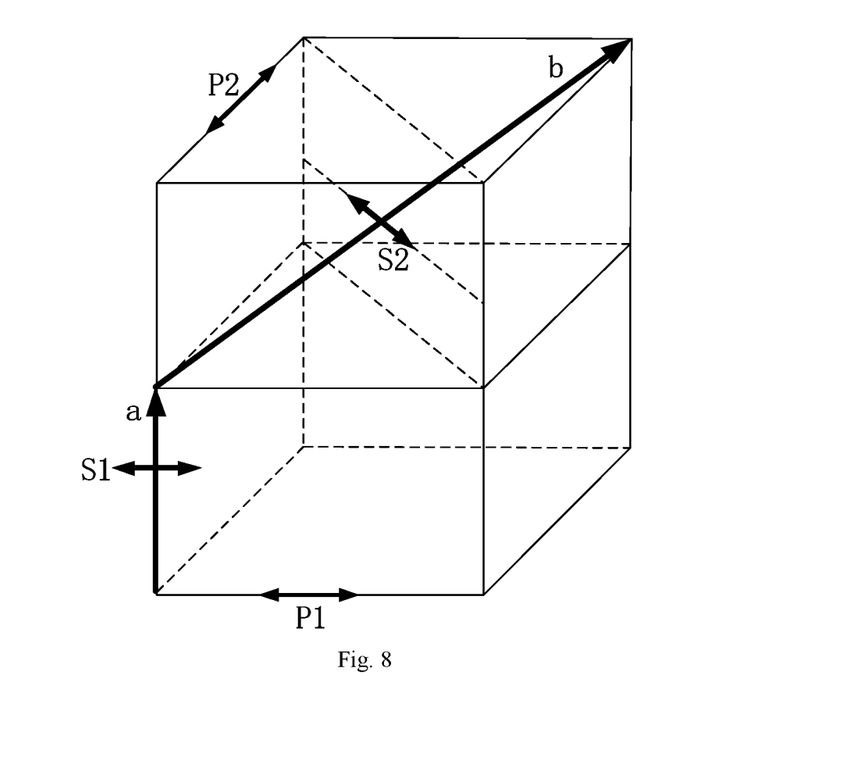
FIG. 8 is a schematic diagram of a principle of realizing gray-scale display through two-dimensional transformation of the transmission direction of the light in an embodiment of the present disclosure.

FIG. 7 is a schematic diagram of a display principle of a display panel in a bright state. FIG. 8 is a schematic diagram of the principle of realizing gray-scale display through two-dimensional transformation of the transmission direction of the light.

As shown in FIG. 7 and FIG. 8, light a is obtained after the light taken out by the light taking grating 201 passes through the first wire grid structure 202. The polarization direction S1 of light a is the same as the direction of the light transmitting axis P1 of the first wire grid structure 202. The plane in which the light a is transmitted in the waveguide is a zx plane, that is, the transmission angle of light a is (θ≠0, φ=0). When the display panel displays in a bright state, the liquid crystal layer is equivalent to a diffraction grating structure, and the diffraction grating structure can scatter the collimated grating two-dimensionally in an inclined manner. As shown in FIG. 7, after light a propagated along the direction of axis z passes through the liquid crystal layer, the propagation direction of the light is deflected two-dimensionally, and the light is scattered to a plurality of lights, such as the plurality of inclined lights in FIG. 7. With light b as an example, the transmission angle of light b becomes (θ≠0 φ≠0), that is, the transmission direction of light is deflected two-dimensionally (θ, φ) in space. Due to a change of the transmission direction of light, the polarization direction of light is correspondingly inclined at a two-dimensional angle. As in FIG. 7 and FIG. 8, the polarization direction of light b after passing through the liquid crystal layer is S2, the polarization direction S2 of light b is not vertical to the light transmitting axis P2 of the second wire grid structure 203, therefore, light b can penetrate through the second wire grid structure 203 and is emitted, thereby realizing bright-state display of the display panel.

Specifically, in the above display panel provided in an embodiment of the present disclosure, as shown in FIG. 3 and FIG. 4, the first electrode structure 204 is of a blocky structure.

Figure 9:
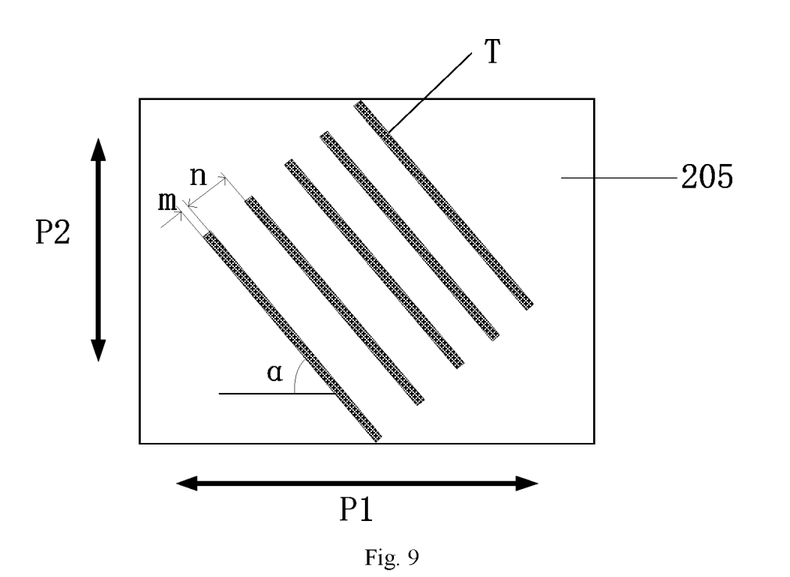
FIG. 9 is a schematic diagram of a specific structure of a second electrode structure in an embodiment of the present disclosure.

Also refer to FIG. 9, the second electrode structure 205 includes a plurality of strip-shaped sub-electrodes T which are parallel to each other. An included angle α between the extension direction of the sub-electrode T and the direction of the light transmitting axis P1 of the first wire grid structure is between 10° and 80°. That is, the included angle between the extension direction of the sub-electrode T and the direction of the light transmitting axis P1 of the first wire grid structure 202 is an acute angle.

As shown in FIG. 9, the included angle between the extension direction of the sub-electrode T and the direction of the light transmitting axis P1 of the first wire grid structure 202 is α, that is, α is greater than 10° and smaller than 80°.

Since the direction of the light transmitting axis P1 of the first wire grid structure 202 is vertical to the direction of the light transmitting axis P2 of the second wire grid structure 203, and the included angle between the extension direction of the sub-electrode T and the direction of the light transmitting axis P1 of the first wire grid structure 202 is an acute angle, then the included angle between the extension direction of the sub-electrode T and the direction of the light transmitting axis P2 of the second wire grid structure 203 is also an acute angle, or, it can be understood that, the extension direction of the sub-electrode T is not in parallel to or vertical to the direction of the light transmitting axis P1 of the first wire grid structure 202, and the extension direction of the sub-electrode T is not in parallel to or vertical to the direction of the light transmitting axis P2 of the second wire grid structure 203.

The first electrode structure 204 is set to be of a blocky structure, and the second electrode structure 205 is set to include a plurality of sub-electrodes in parallel to each other, thereby forming an electric field which can drive the liquid crystal molecules to deflect, to drive the liquid crystal layer 104 to form a diffraction grating structure, moreover, the grating vector of the formed diffraction grating structure is vertical to the extension direction of the sub-electrode T, such that the direction of the grating vector of the formed diffraction grating structure can be adjusted through adjusting the extension direction of the sub-electrode T. Wherein in the diffraction grating structure formed by the liquid crystal layer 104, the refractive index of the liquid crystal layer 104 is changed periodically to constitute a strip structure, and the direction of the grating vector can be understood to be vertical to the extension direction of the strip structure.

Specifically, in order that the first electrode structure 204 is insulated from the second electrode structure 205, an insulating layer can be arranged between the film layer at which the first electrode structure 204 is located and the film layer at which the second electrode structure 205 is located.

Specifically, in the above display panel provided in an embodiment of the present invention, as shown in FIG. 3 and FIG. 4, the first electrode structure 204 is arranged between the liquid crystal layer 104 and the first wire grid structure 202; the second electrode structure 205 is arranged between the first electrode structure 204 and the liquid crystal layer 104.

In addition, the first electrode structure 204 and the second electrode structure 205 can also be arranged at other positions, for example, the first electrode structure 204 and the second electrode structure 205 can be respectively arranged at two sides of the liquid crystal layer 104, or can be both arranged between the opposite substrate 103 and the liquid crystal layer 104, and the specific positions of the first electrode structure and the second electrode structure are not defined herein.

Optionally, the included angle α is set to be between 10° and 80°, to ensure a large light emitting amount of the display panel in a bright state, and satisfy the brightness requirements of the display panel for picture display. If the included angle α is overlarge, the extension direction of the sub-electrode T will be approximately vertical to the light transmitting axis P1 of the first wire grid structure, such that less light can penetrate through the first wire grid structure, similarly, if the included angle is too small, the extension direction of the sub-electrode T will be approximately vertical to the light transmitting axis P2 of the second wire grid structure, such that less light can penetrate through the second wire grid structure. Optionally, in order that the light emitting amount of the display panel in a bright state is large, the angle α can be set to 45°, that is, the included angles between the extension direction of each sub-electrode T and the direction of the light transmitting axis P1 of the first wire grid structure as well as the direction of the light transmitting axis P2 of the second wire grid structure are both 45°, or, the numerical value of the included angle α can also be adjusted according to actual requirements, and the extension direction of the sub-electrode T is not defined herein.

Further, in the above display panel provided in an embodiment of the present disclosure, as shown in FIG. 3 and FIG. 4, in a light extraction structure 105, an orthographic projection of the light taking grating 201 on the light guide plate 101 is within the orthographic projection of the first wire grid structure 202 on the light guide plate 101, an orthographic projection of the light taking grating 201 on the light guide plate 101 is within the orthographic projection of the second wire grid structure 201 on the light guide plate 101; and the projected area of the light taking grating 201 on the light guide plate 101 is smaller than the projected area of the first wire grid structure 202 on the light guide plate 101, and the projected area of the light taking grating 201 on the light guide plate 101 is smaller than the projected area of the second wire grid structure 203 on the light guide plate 101.

During specific implementation, also refer to FIG. 6, the light taken out by the light taking grating 201 can be controlled to be a collimated beam, however, due to the limitation of the aperture of the light taking grating 201, the collimated beam taken out by the light taking grating 201 may have the pinhole diffraction light, and the dotted line in FIG. 6 represents the pinhole diffraction light. The size of the first wire grid structure 202 and the second wire grid structure 203 is set to be larger than the size of the light taking grating 201, and the orthographic projections of the first wire grid structure 202 and the second wire grid structure 203 on the light guide plate 101 cover the orthographic projection of the light taking grating 201 on the light guide plate 101, therefore, when no electric field is applied to two sides of the liquid crystal layer 104, the collimated beam taken out by the light taking grating 201 and the pinhole diffraction light carried by the light taking grating 201 will not penetrate through the second wire grid structure 203, for example, each pinhole diffraction light in FIG. 6 cannot penetrate through the second wire grid structure 203, thereby ensuring a dark state of the display panel. Specifically, since the angle of the collimated beam taken out by the light taking grating 201 when the pinhole diffraction light is deviated from the light taking grating 201 is small, the size of the first wire grid structure 202 and the second wire grid structure 203 can only be set to be slightly larger than the size of the light taking grating 201. Generally, the size of the light taking grating 201 is between 10 µm and 20 µm, and the size of the first wire grid structure 202 and the second wire grid structure 203 can be determined according to actual requirements, which is not defined herein.

In addition, to ensure that the light emitted by the light taking grating 201 is completely shaded, the geometric centers of the light taking grating 201, the first wire grid structure 202 and the second wire grid structure 203 can be in one-to-one correspondence.

More further, in the above display panel provided in an embodiment of the present disclosure, also refer to FIG. 3 and FIG. 4, in a light extraction structure 105, an orthographic projection of the first wire grid structure 202 on the light guide plate 101 is within the orthographic projection of the second wire grid structure 203 on the light guide plate 101, and the projected area of the first wire grid structure 202 on the light guide plate 101 is smaller than or equal to the projected area of the second wire grid structure 203 on the light guide plate 101.

When the display panel is displayed in a bright state, since the diffraction grating structure formed by the liquid crystal layer 104 will diffract and scatter the light in an inclined manner, the size of the second wire grid structure 203 is set to be larger than the size of the first wire grid structure 202, and the orthographic projection of the second wire grid structure 203 on the light guide plate 101 covers the orthographic projection of the first wire grid structure 202 on the light guide plate 101, thereby ensuring that the light after the deflection effect of the liquid crystal layer 104 can still be emitted out through the second wire grid structure 203, and ensuring the uniformity of display brightness of the display panel in a bright-state display process.

Optionally, in the above display panel provided in an embodiment of the present disclosure, as shown in FIG. 3, the light taking grating 201 is arranged on a side, facing away from the liquid crystal layer 104, of the light guide plate 101, and the light taking grating 201 is a reflection grating. Specifically, the reflection grating can include a transmission grating structure, and a reflecting layer arranged on a side, facing away from the light guide plate 101, of the grating structure, for example, a layer of metal can be coated on the grating structure to serve as a reflecting layer, such that the light can be taken out to the side, facing the liquid crystal layer 104, of the light guide plate 101.

Or, in the above display panel provided in an embodiment of the present disclosure, as shown in FIG. 4, the light taking grating 201 is arranged on a side, facing the liquid crystal layer 104, of the light guide plate 101, and the light taking grating 201 is a transmission grating. When a transmission grating is adopted, the light can be directly taken out from the side, facing the liquid crystal layer 104, of the light guide plate 101.

As shown in FIG. 3 and FIG. 4, to protect the light taking grating 201, a first protective layer 109 can be arranged on the side, facing away from the light guide plate 101, of the light taking grating 201, moreover, to ensure that the light inside the light guide plate 101 can be transmitted with total reflection, the first protective layer 109 can adopt materials with the refractive index being lower than that of the light guide plate 101 and the light taking grating 201. Specifically, the material of the first protective layer 109 can be a resin material, and can also be other materials, which is not defined herein.

Optionally, in the above display panel provided in an embodiment of the present disclosure, as shown in FIG. 3 and FIG. 4, first electrode structures 204 in the plurality of light extraction structures 105 are of an integrated structure. That is, the first electrode structures 204 are set in a whole layer, and the integrated structure constituted by first electrode structures 204 is called a first electrode layer below. During specific implementation, a fixed signal can be applied to the first electrode layer, and different electrical signals can be applied to different second electrode structures 205, to realize different gray scales of different pixel units, and realize picture display. Specifically, transparent conductive materials can be adopted to manufacture the first electrode layer, for example, indium tin oxide (ITO) can be adopted to manufacture each first electrode layer.

Optionally, refer to FIG. 3 and FIG. 4, since the light extraction structures 105 and the pixel units of the display panel are in one-to-one correspondence with each other, to satisfy requirements of display, generally, a plurality of pixel units will be arranged according to a certain rule, for example, a plurality of pixel units can be arranged in an array, and the arrangement rule of the light extraction structures 105 can be the same as the arrangement rule of the pixel units. specifically, besides the first electrode layer which is set in a whole layer, a plurality of light taking gratings 201, a plurality of first wire grid structures 202, a plurality of second wire grid structures 203 and a plurality of second electrode structures 205 are respectively arranged in respective film layer according to a certain rule, and the arrangement rule can also be the same as the arrangement rule of a plurality of pixels.

During specific implementation, in the above display panel provided in an embodiment of the present disclosure, as shown in FIG. 9, in a direction vertical to the extension direction of the sub-electrode T, the sum of the width m of the sub-electrode T and the width n of the gap between two adjacent sub-electrodes T is within a range of 2 μm to 10 μm.

Since the grating parameters of the diffraction grating structure formed by the liquid crystal layer is determined by the first electrode structure and the second electrode structure, while the first electrode structure is blocky, and the second electrode structure includes a plurality of strip-shaped sub-electrodes T which are parallel to each other, therefore, the grating parameters of the diffraction grating structure formed by the liquid crystal layer are mainly determined by the second electrode structure. Specifically, the grating vector of the diffraction grating structure formed by the liquid crystal layer is the same as the extension direction of the sub-electrode T, the grating period of the diffraction grating structure is half of the repetition period of each sub-electrode structure in the second electrode structure, and a plurality of sub-electrodes T in the second electrode structure are arranged at equal intervals, therefore, the repletion period of each sub-electrode structure is as follows: the sum of a width m and the width n of the gap between two adjacent sub-electrodes T.

Figure 10:
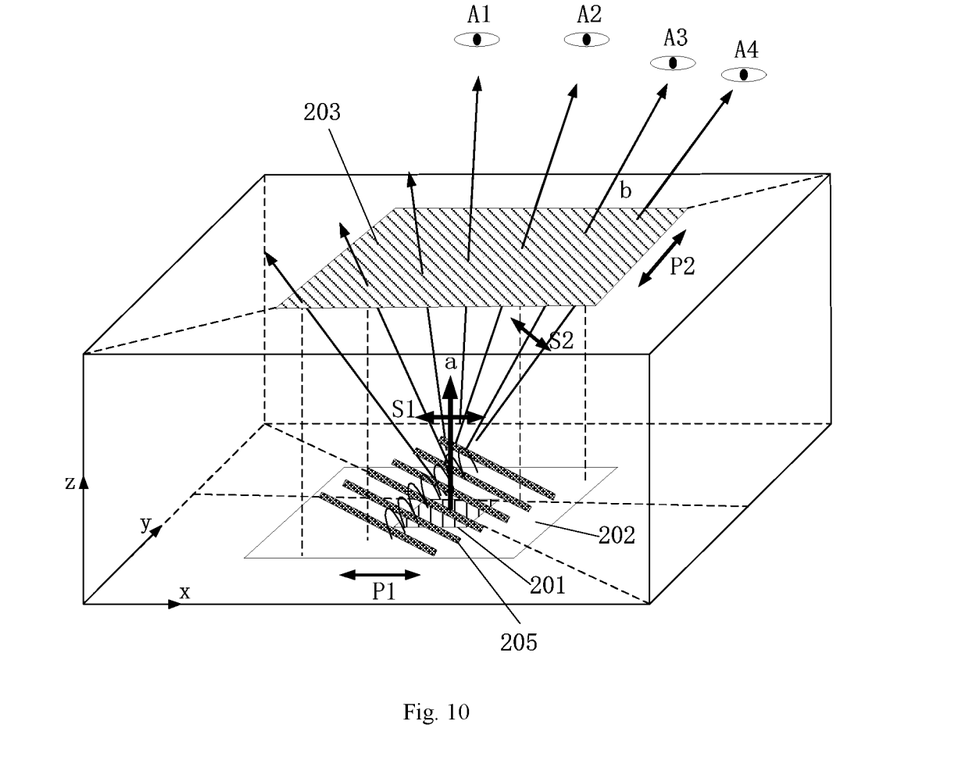
FIG. 10 is a schematic diagram of an effect of realizing a wide viewing angle by a display panel in an embodiment of the present disclosure.

Therefore, when the sum of m and n is set to be within a range of 2 μm to 10 μm, it can be understood that the grating period of the diffraction grating structure formed by the liquid crystal layer is set to be within a range of 1 μm to 5 μm. When the grating period of the diffraction grating structure is set to be of a micro dimension, the collimated beam of a single angle can be scattered in a two-dimensional direction to divergent beams distributed at 20 to 40 angles, and the divergence angle is between 0° and 80°, that is, in an embodiment of the present disclosure, through two-dimensional direction angle control of the light propagation direction, the range of field of view of the display panel can be enlarged to 0° to 80°, such that the display panel provided in an embodiment of the present disclosure has the characteristic of a wide viewing angle, as shown in FIG. 10, human eyes at positions A1, A2, A3 and A4 of different viewing angles can all view the displayed picture. In the figure, only the divergent beams distributed at four angles are illustrated, and the quantity of divergent beams is not defined. Moreover, the grating period of the diffraction grating structure formed by the liquid crystal layer can be controlled according to actual requirements, as long as the grating period of the diffraction grating structure is of a micron dimension, and the grating period of the diffraction grating structure is not defined herein.

Specifically, as shown in FIG. 3 and FIG. 4, the above display panel provided in an embodiment of the present disclosure can further include: a coupling element 106 arranged between the light source 102 and the side surface of the light guide plate 101; the coupling element 106 is configured to couple the light emitted by the light source 102 to the light guide plate 101 at a set angle.

Through setting a coupling element 106 which couples the light emitted by the light source 102 into a light guide plate 101, most of the light emitted to the light guide plate 101 can be ensured to transmit with total reflection within the light guide plate 101, thereby ensuring normal display effect of the display panel. Optionally, the coupling element 106 can be a metallic reflection grating or a freeform reflector.

During practical applications, as shown in FIG. 3 and FIG. 4, the above display panel provided in an embodiment of the present disclosure can further include: a color film layer 107 arranged between the opposite substrate 103 and the liquid crystal layer 104; the color film layer 107 includes: a plurality of color film units Q in one-to-one correspondence with the plurality of light extraction structures 105.

Through setting a plurality of color film units Q in one-to-one correspondence with each light extraction structure 105, after the light emitted from the light extraction structure 105 is emitted to the color film unit Q, the corresponding pixel unit can present a single color, for example, after passing through a red color film unit Q, the corresponding pixel unit is red, therefore, the display panel realizes color display. During specific implementation, the above color film layer 107 can be a quantum dot color film (QD-CF) layer, and other materials can also be adopted to serve as a color film layer, which is not defined herein.

Specifically, in the above display panel provided in an embodiment of the present disclosure, the color film layer 107 is arranged between the opposite substrate 103 and the film layer at which the second wire grid structure 203 is located; an orthographic projection of the second wire grid structure 203 on the light guide plate 101 is within an orthographic projection of the corresponding color film unit 107 on the light guide plate 101.

The orthographic projection of the color film unit 107 on the light guide plate 101 covers the orthographic projection of the second wire grid structure 203 on the light guide plate 101, such that the light emitted from the second wire grid structure 203 can completely shine upon the color film unit 107, and the color display effect of the display panel is favorable.

During specific implementation, the color film layer 107 can be arranged at other positions, and the specific position of the color film layer 107 is not defined herein.

Optionally, to perform planarization on the color film layer 107, a planarization layer 112 can be arranged on the side, facing away from the opposite substrate 103, of the color film layer 108.

In addition, also refer to FIG. 3 and FIG. 4, to protect the first wire grid structure 202 and the second wire grid structure 203, a second protective layer 110 can be arranged on the side, facing away from the light guide plate 101, of the first wire grid structure 202, and a third protective layer 111 can be arranged on the side, facing away from the liquid crystal layer 104, of the second wire grid structure 203. As to the structure shown in FIG. 3, the second protective structure 110 is adjacent to the light guide plate 101, and the second protective structure 110 generally adopts a material with the refractive index being smaller than that of the light guide plate 101, thereby ensuring that the light in the light guide plate 101 satisfies the total reflection conditions. Specifically, the second protective structure 110 and the third protective layer 111 can adopt a resin material, and can also adopt other materials with a low refractive index, which is not defined herein.

Figure 11:
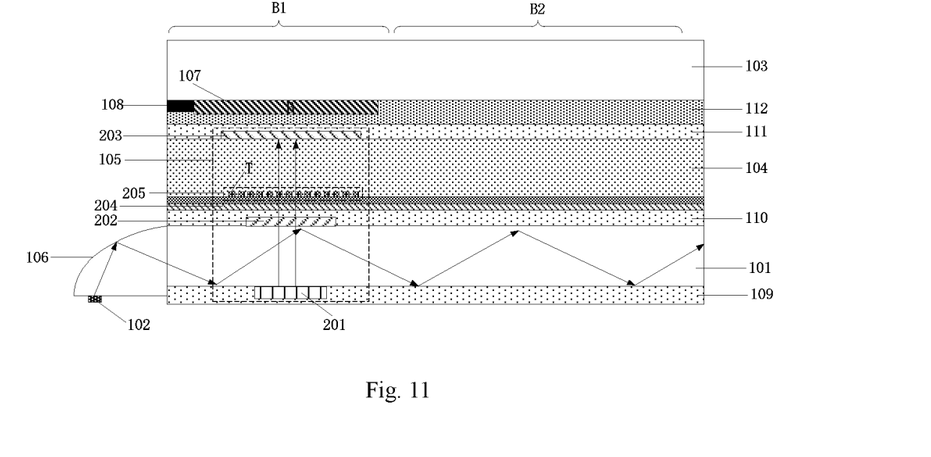
FIG. 11 is a schematic diagram of an effect of realizing transparent display by a display panel in an embodiment of the present disclosure.

In addition, the above display panel provided in an embodiment of the present disclosure can also realize transparent display, specifically, as shown in FIG. 11, the display panel is divided into a plurality of pixel units, and FIG. 11 takes one of the pixel units as an example for illustration; a plurality of pixel units are in one-to-one correspondence with each light extraction structure 105, and the light extraction structure 105 is arranged within the corresponding pixel unit; the pixel unit further includes a transparent region in addition to the region of the corresponding light extraction structure 105 (such as the region B2 in FIG. 11).

That is to say, the pixel unit includes a display region B1 and a transparent region B2 corresponding to the light extraction structure 105. Since the light taken out by the light taking grating 201 is a collimated beam, that is, the light taken out by the light taking grating 201 is a beam transmitted at a single direction, therefore, the size of the first wire grid structure 202 and the second wire grid 203 does not need to be overlarge, and the collimated beam taken out by the light taking grating 201 can be shaded, to realize a dark state of the display panel, therefore, the total area of the transparent region in the display panel can be ensured to be relatively large, to achieve the effect of transparent display.

Optionally, as shown in FIG. 11, the above display panel provided in an embodiment of the present disclosure further includes: a shading layer 108 arranged between the opposite substrate 103 and the film layer at which the second wire grid structure 203 is located; the figure of the shading layer 108 is arranged between adjacent pixel units; and a gap is formed between the figure of the shading layer 108 and the color film unit 107.

A shading layer 108 is set to shade part of traces in the display panel, thereby keeping the traces in the display panel from influencing the aperture ratio of the pixel unit, and ensuring that the display panel has a favorable display effect. A gap is formed between the figure of the shading layer 108 and the color film unit 107, such that the gap between the shading layer 108 and the color film unit 107 is transmitting, and the transmitting region has a high transparency.

Based on the same inventive concept, an embodiment of the present invention further provides a driving method of the above display panel, since the principle for solving problems of the driving method is similar to that of the above display panel, for the implementation of the driving method, please refer to the implementation of the above display panel, and the repeated parts will not be repeated redundantly herein.

Figure 12:
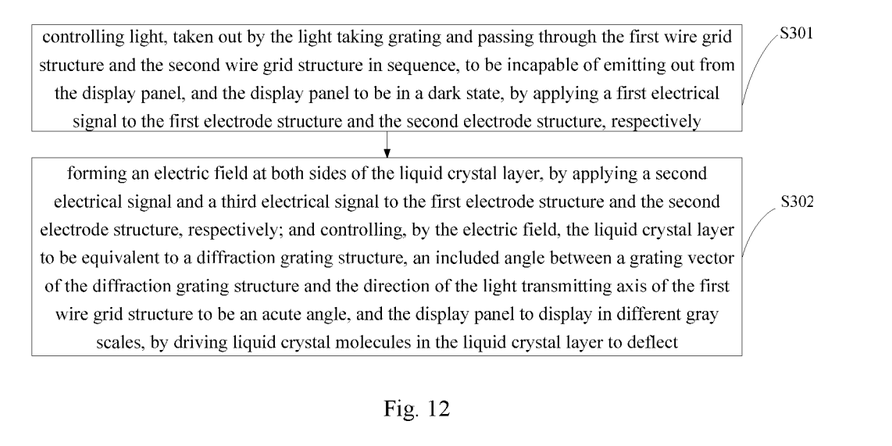
FIG. 12 is a flow chart of a method for driving the above display panel provided in an embodiment of the present disclosure.

Specifically, as shown in FIG. 12, the method for driving the above display panel provided in an embodiment of the present disclosure includes S301 and S302.

S301, controlling light, taken out by the light taking grating and passing through the first wire grid structure and the second wire grid structure in sequence, to be incapable of emitting out from the display panel, and the display panel to be in a dark state, by applying a first electrical signal to the first electrode structure and the second electrode structure, respectively.

Specifically, through applying a first electrical signal to the first electrode structure and the second electrode structure, respectively, the voltage at two sides of the liquid crystal layer is consistent, then the same voltage can be applied to two sides of the liquid crystal layer, or directly no voltage is applied, that is, no electric field is applied to two sides of the liquid crystal layer, such that the liquid crystal layer has no effect on the light, and the light taken out by the light taking grating cannot be emitted after passing through the first wire grid structure and the second wire grid structure, thereby realizing the dark state of the display panel.

S302, forming an electric field at both sides of the liquid crystal layer, by applying a second electrical signal and a third electrical signal to the first electrode structure and the second electrode structure, respectively; and controlling, by the electric field, the liquid crystal layer to be equivalent to a diffraction grating structure, an included angle between a grating vector of the diffraction grating structure and the direction of the light transmitting axis of the first wire grid structure to be an acute angle, and the display panel to display in different gray scales, by driving liquid crystal molecules in the liquid crystal layer to deflect.

Specifically, through applying the second electrical signal and the third electrical signal to the first electrode structure and the second electrode structure, respectively, the voltages at two sides of the liquid crystal layer are not consistent and an electric field is formed, and the liquid crystal layer is equivalent to a diffraction grating structure under the effect of an electric field. The diffraction grating structure can diffract and modulate the light, to diffract and scatter the light in an inclined manner, in this way, through two-dimensional deflection of the transmission direction of light, the polarization direction of light is no longer vertical to the second wire grid structure, such that the light can pass through the second wire grid structure and is emitted, thereby realizing bright-state display of the display panel.

Based on the same inventive concept, an embodiment of the present invention further provides a display device which includes the above display panel. The display device can be applied to a mobile phone, a tablet personal computer, a television, a display, a notebook computer, a digital photo frame, a navigator and any other products or parts with a display function. Since the principle for solving problems of the display device is similar to that of the above display panel, for the implementation of the display device, please refer to the implementation of the above display panel, and the repeated parts will not be repeated redundantly herein.

Specifically, as shown in FIG. 3, the above display device includes: the above display panel and a light source 102; the light source 102 is arranged on the side face of the light guide plate 101, and is configured to provide to the light guide plate 101 the light that is incident at a set angle.

As to the display panel, the driving method thereof and the display device provided in an embodiment of the present disclosure, through setting a first wire grid structure and a second wire grid structure with the transmission axes being vertical to each other, when no electric field is applied to the two sides of a liquid crystal layer, the liquid crystal layer has no effect on the light, and the light taken out by the light taking grating cannot be emitted after passing through the first wire grid structure and the second wire grid structure, thereby realizing the dark state of the display panel. Through applying an electric field to two sides of the liquid crystal layer, the liquid crystal layer is equivalent to a diffraction grating structure, to diffract and scatter the light in an inclined manner, in this way, through two-dimensional deflection of the transmission direction of light, the polarization direction of light is no longer vertical to the second wire grid structure, such that the light can pass through the second wire grid structure and is emitted, thereby realizing bright-state display of the display panel. Moreover, due to the diffraction and modulation effects of the liquid crystal layer, the collimated light can be scattered into multidirectional divergent light, such that users can view the displayed pictures of the display panel from each direction, and the display panel has a wide viewing angle.

In addition, the size of the first wire grid structure and the second wire grid structure is set to be larger than the size of the light taking grating, and the orthographic projections of the first wire grid structure and the second wire grid structure on the light guide plate cover the orthographic projection of the light taking grating on the light guide plate, therefore, when no electric field is applied to two sides of the liquid crystal layer, the collimated beam taken out by the light taking grating and the pinhole diffraction light carried by the light taking grating will not penetrate through the second wire grid structure, thereby avoiding dark-state light leakage of the display panel.

Although the preferred embodiments of the present invention have been described, however, those skilled in the art can make additional variations and modifications to these embodiments once they learn about the concept of basic creativity. Therefore, the appended claims are interpreted to encompass preferred embodiments and all the variations and modifications falling within the scope of the present invention.

Evidently those skilled in the art can make various modifications and variations to the embodiment of the present invention without departing from the spirit and scope of the embodiment of the present invention. Thus the present invention is also intended to encompass these modifications and variations thereto so long as the modifications and variations come into the scope of the claims appended to the present invention and their equivalents.

What is claimed is:

1. A display panel, comprising:
   a light guide plate, configured to propagate light incident at a set angle by total reflection;
   an opposite substrate, arranged opposite to the light guide plate;
   a liquid crystal layer, arranged between the light guide plate and the opposite substrate; and
   a plurality of light extraction structures;
   wherein each light extraction structure comprises:
      a light taking grating arranged on a surface of one side of the light guide plate away from the liquid crystal layer;
      a first wire grid structure arranged on a surface of one side of the light guide plate close to the liquid crystal layer;
      a second wire grid structure arranged between the liquid crystal layer and the opposite substrate;
      a first electrode structure arranged between the first wire grid structure and the opposite substrate; and
      a second electrode structure arranged between the first wire grid structure and the opposite substrate;
      wherein a direction of a light transmitting axis of the first wire grid structure is vertical to a direction of a light transmitting axis of the second wire grid structure;
      the first electrode structure is of a blocky structure; and
      the second electrode structure comprises a plurality of strip-shaped sub-electrodes which are parallel to each other; and an included angle between an extension direction of each sub-electrode and the direction of the light transmitting axis of the first wire grid structure ranges from 10° to 80°;
      wherein in a direction vertical to the extension direction of each sub-electrode, a sum of a width of the each sub-electrode and a width of a gap between two adjacent sub-electrodes ranges from 2 μm to 10 μm.

2. The display panel according to claim 1, wherein in the each light extraction structure,
   an orthographic projection of the light taking grating on the light guide plate is within an orthographic projection of the first wire grid structure on the light guide plate;
   the orthographic projection of the light taking grating on the light guide plate is within an orthographic projection of the second wire grid structure on the light guide plate.

3. The display panel according to claim 2, wherein in the each light extraction structure,
   the orthographic projection of the first wire grid structure on the light guide plate is within the orthographic projection of the second wire grid structure on the light guide plate.

4. The display panel according to claim 1, wherein the light taking grating is arranged on a side, facing away from the liquid crystal layer, of the light guide plate, and the light taking grating is a reflection grating.

5. The display panel according to claim 1, wherein the light taking grating is arranged on a side, facing the liquid crystal layer, of the light guide plate, and the light taking grating is a transmission grating.

6. The display panel according to claim 1, wherein first electrode structures in the plurality of light extraction structures are of an integrated structure.

7. The display panel according to claim 1, wherein,
the first electrode structure is arranged between the liquid crystal layer and the first wire grid structure; and
the second electrode structure is arranged between the first electrode structure and the liquid crystal layer.

8. The display panel according to claim 1, further comprising: a coupling element arranged between a light source and a side surface of the light guide plate;
wherein the coupling element is configured to couple light emitted by the light source to the light guide plate at the set angle.

9. The display panel according to claim 1, further comprising: a color film layer arranged between the opposite substrate and the liquid crystal layer;
wherein the color film layer comprises: a plurality of color film units in one-to-one correspondence with the plurality of light extraction structures.

10. The display panel according to claim 9, wherein the color film layer is arranged between the opposite substrate and a film layer at which the second wire grid structure locates; and
an orthographic projection of the second wire grid structure on the light guide plate is within an orthographic projection of a corresponding color film unit on the light guide plate.

11. The display panel according to claim 9, wherein the display panel comprises a plurality of pixel units;
the plurality of pixel units are in one-to-one correspondence with the plurality of light extraction structures;
the each light extraction structure is arranged within a corresponding pixel unit; and
each pixel unit comprises a transparent region and a region of a corresponding light extraction structure.

12. The display pane according to claim 11, further comprising: a shading layer arranged between the opposite substrate and a film layer at which the second wire grid structure locates;
wherein a pattern of the shading layer is arranged between adjacent pixel units; and
a gap is formed between the pattern of the shading layer and each of the color film units.

13. A method for driving the display panel according to claim 1, comprising:
controlling light, taken out by the light taking grating and passing through the first wire grid structure and the second wire grid structure in sequence, to be incapable of emitting out from the display panel, and the display panel to be in a dark state, by applying a first electrical signal to the first electrode structure and the second electrode structure, respectively; and
forming an electric field at both sides of the liquid crystal layer, by applying a second electrical signal and a third electrical signal to the first electrode structure and the second electrode structure, respectively; and
controlling, by the electric field, the liquid crystal layer to be equivalent to a diffraction grating structure, an included angle between a grating vector of the diffraction grating structure and the direction of the light transmitting axis of the first wire grid structure to be an acute angle, and the display panel to display in different gray scales, by driving liquid crystal molecules in the liquid crystal layer to deflect.

14. A display device, comprising a display panel and a light source;
wherein the display panel comprises:
a light guide plate, configured to propagate light incident at a set angle by total reflection;
an opposite substrate, arranged opposite to the light guide plate;
a liquid crystal layer, arranged between the light guide plate and the opposite substrate; and
a plurality of light extraction structures;
wherein each light extraction structure comprises:
a light taking grating arranged on a surface of one side of the light guide plate away from the liquid crystal layer;
a first wire grid structure arranged on a surface of one side of the light guide plate close to the liquid crystal layer;
a second wire grid structure arranged between the liquid crystal layer and the opposite substrate;
a first electrode structure arranged between the first wire grid structure and the opposite substrate; and
a second electrode structure arranged between the first wire grid structure and the opposite substrate;
wherein a direction of a light transmitting axis of the first wire grid structure is vertical to a direction of a light transmitting axis of the second wire grid structure;
the first electrode structure is of a blocky structure; and
the second electrode structure comprises a plurality of strip-shaped sub-electrodes which are parallel to each other; and an included angle between an extension direction of each sub-electrode and the direction of the light transmitting axis of the first wire grid structure ranges from 10° to 80°;
wherein the light source is arranged on a side face of the light guide plate, and is configured to provide the light guide plate with the light incident at the set angle;
wherein in a direction vertical to the extension direction of each sub-electrode, a sum of a width of the each sub-electrode and a width of a gap between two adjacent sub-electrodes ranges from 2 μm to 10 μm.

* * * * *